April 30, 1963
T. C. BENNETT, JR
3,087,458
ANIMAL CAGES WITH INTERLOCKING FRAMING
AND INTERLOCKING GUTTER
Filed March 20, 1959
4 Sheets-Sheet 1

Thomas C. Bennett, Jr.
INVENTOR.

BY Clarence A. O'Brien
and Harvey B. Jacobson
Attorneys

April 30, 1963 T. C. BENNETT, JR 3,087,458
ANIMAL CAGES WITH INTERLOCKING FRAMING
AND INTERLOCKING GUTTER
Filed March 20, 1959 4 Sheets-Sheet 2
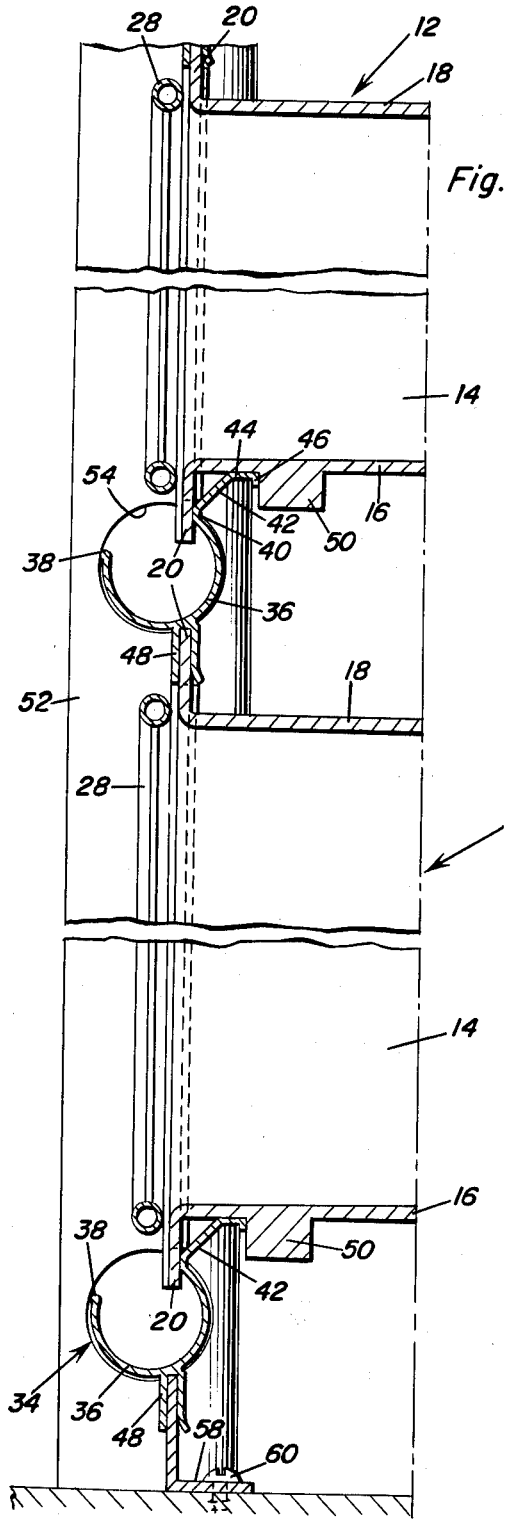
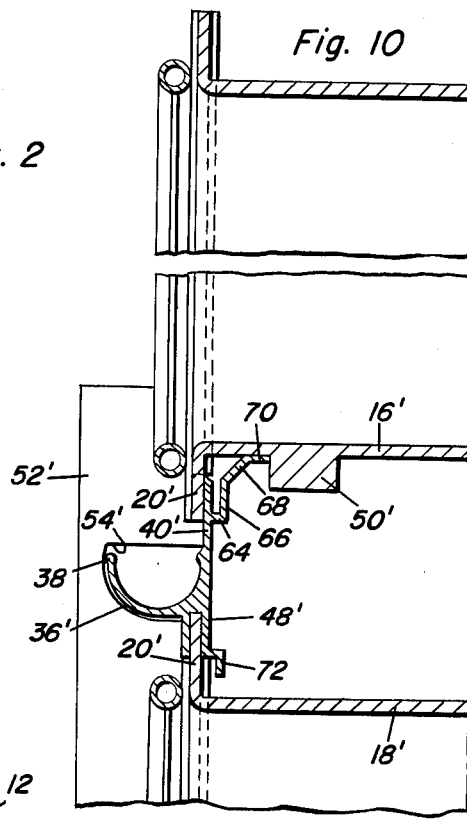
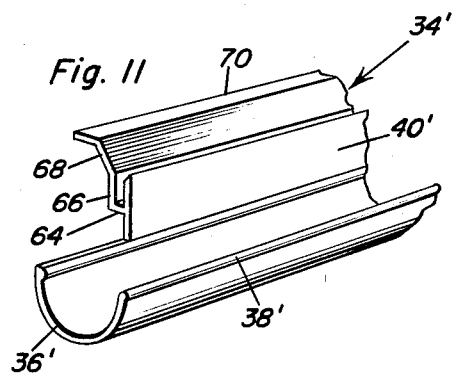
Thomas C. Bennett, Jr.
INVENTOR.

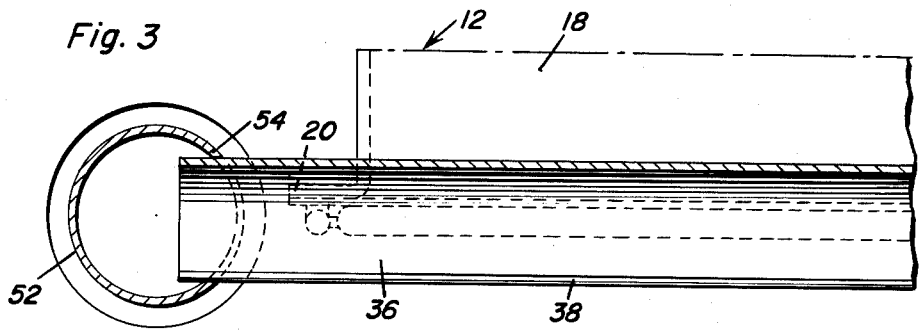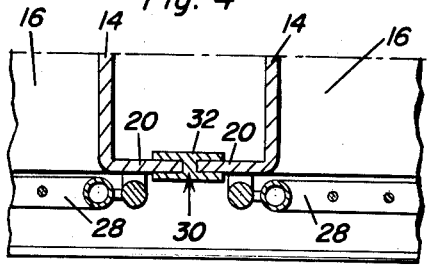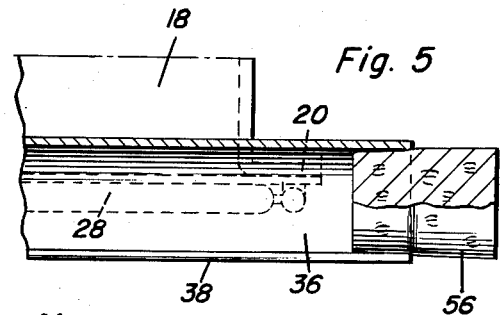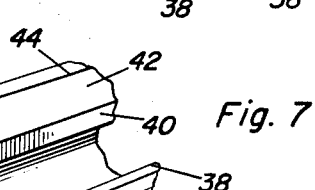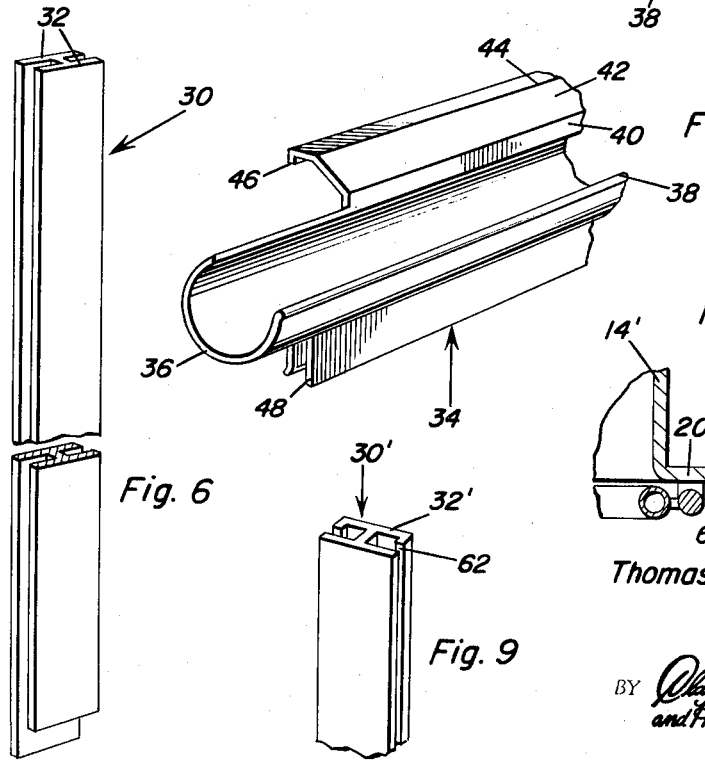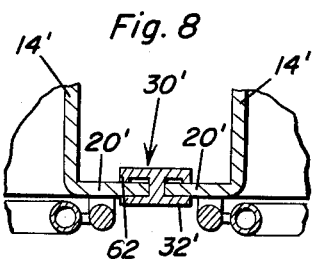
Thomas C. Bennett, Jr.
INVENTOR.

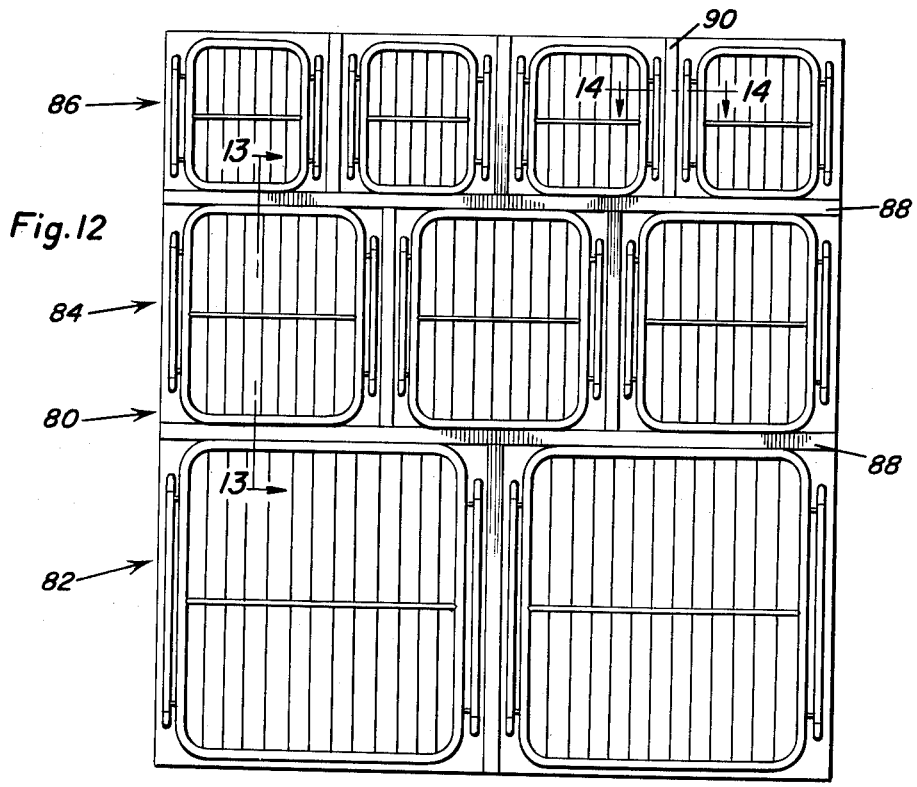
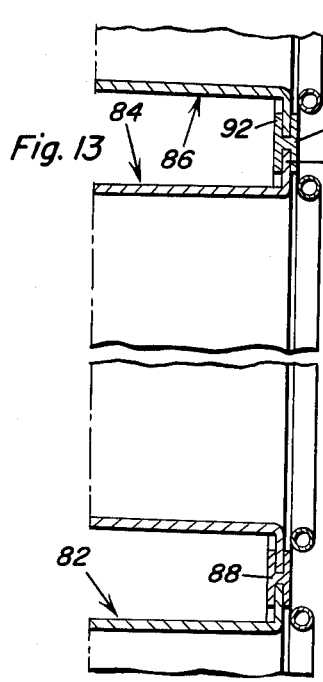
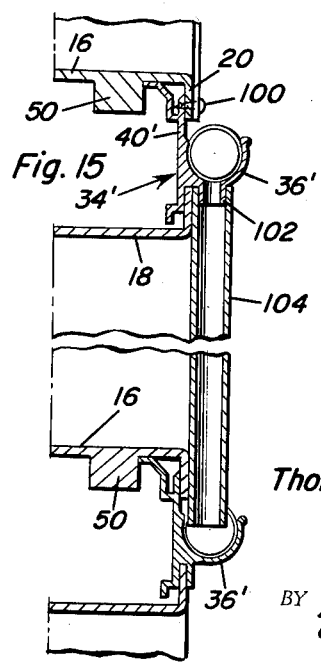
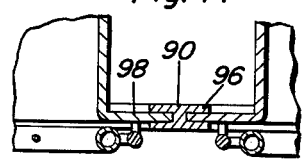
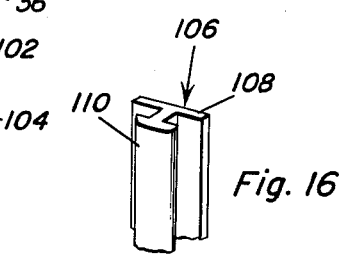
Thomas C. Bennett, Jr.
INVENTOR.

United States Patent Office 3,087,458
Patented Apr. 30, 1963

3,087,458
ANIMAL CAGES WITH INTERLOCKING FRAMING AND INTERLOCKING GUTTER
Thomas C. Bennett, Jr., North Miami, Fla.
Filed Mar. 20, 1959, Ser. No. 800,713
13 Claims. (Cl. 119—17)

The present invention generally relates to a cage or pen construction for animals and more particularly to such a construction constructed of fiber impregnated resin plastic having a built-in interlocking gutter feature.

The primary object of the present invention is to provide an interlocking framing channel disposed both vertically and horizontally for permitting and facilitating a fast, efficient and economical method of assembling, disassembling and rearranging individual animal cages of various sizes and numbers into one integral, stationary or mobile, unit while utilizing a minimum number of tools and labor.

A further object of the present invention is to provide an animal cage assembly having an interlocking framing with a surface provided with rounded corners for ease of cleaning thereby increasing the comfort of the animals in the cages since the material from which the cages are constructed is warm to the touch rather than cold to the touch such as in metal or masonry constructions and the cages are long lasting and durable and require very little maintenance.

Still another object of the present invention is to provide a cage assembly employing an interlocking framing channel between the animal cages which is employed both vertically and horizontally for permitting the closest possible assembly of the cages thereby utilizing all available space by eliminating bulky and costly framework.

Yet another feature of the present invention is to provide an animal cage assembly having a built-in drainage gutter with the bottom of the cages being tapered or inclined downwardly and towards the front end thereof for facilitating the cleaning of the cages with the gutters facilitating the drainage of the waste material.

Still another important concept of the present invention is the use of an interlocking framing channel for stacking a plurality of animal cages into a group in which the framing channel is provided with a continuous gutter to provide a simple, sanitary and easily cleaned drainage system for transporting the animal waste and other waste materials from the cages into a common down spout to final disposition in a sewer or other suitable receptacle with the gutter being constructed so that it can be easily plugged at either end with a large cork stopper or a rubber ball.

Aonther very important feature of the present invention is the provision of an animal cage assembly which is simple in construction, easy to assembly and disassemble, relatively inexpensive to manufacture and corrosive resistant as well as being substantially maintenance free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical sectional view, on an enlarged scale, taken substantially upon a plane passing along section line 2—2 of FIGURE 1 illustrating the details of construction of the framing elements with the built-in gutter;

FIGURE 3 is a transverse, plan sectional view, on an enlarged scale, taken substantially upon a plane passing along section line 3—3 of FIGURE 1 illustrating the connection of the horizontal gutters to the common down pipe;

FIGURE 4 is a transverse, plane sectional view, on an enlarged scale, taken substantially upon a plane passing along section line 4—4 of FIGURE 1 illustrating the vertical framing elements for securing the side edges of the cages together together with other structural details of the invention;

FIGURE 5 is a detailed sectional view, on an enlarged scale, taken substantially upon a plane passing along section line 5—5 of FIGURE 1 illustrating the manner in which one end of the gutter may be closed;

FIGURE 6 is a partial perspective view of the vertical framing element illustrating the structure thereof;

FIGURE 7 is a partial perspective view of the horizontal framing element with the built-in gutter;

FIGURE 8 is a sectional view similar to FIGURE 4 but illustrating a slightly modified form of vertical framing elements;

FIGURE 9 is a partial perspective view of the modified framing element illustrated in FIGURE 8;

FIGURE 10 is a sectional view similar to FIGURE 2 but illustrating a modified form of horizontal framing element with the gutter built in;

FIGURE 11 is a partial perspective view of the modified form of framing element shown in FIGURE 10;

FIGURE 12 is a front elevation illustrating a cage assembly using different size cages;

FIGURE 13 is a vertical sectional view, on an enlarged scale, taken substantially upon a plane passing along section line 13—13 of FIGURE 12 illustrating the construction of the framing elements used horizontally in this form of the invention;

FIGURE 14 is a detailed sectional view, on an enlarged scale, taken substantially upon a plane passing along section line 14—14 of FIGURE 12 illustrating the structural details of the vertical framing elements employed in this form of the invention;

FIGURE 15 is a vertical sectional view similar to FIGURE 10 but showing a modified form of the invention in which the built-in gutters are employed and interconnecting pipes are provided between the upper gutters and the lower gutters; and FIGURE 16 is a partial perspective view illustrating a modified form of framing element.

Figure 1:
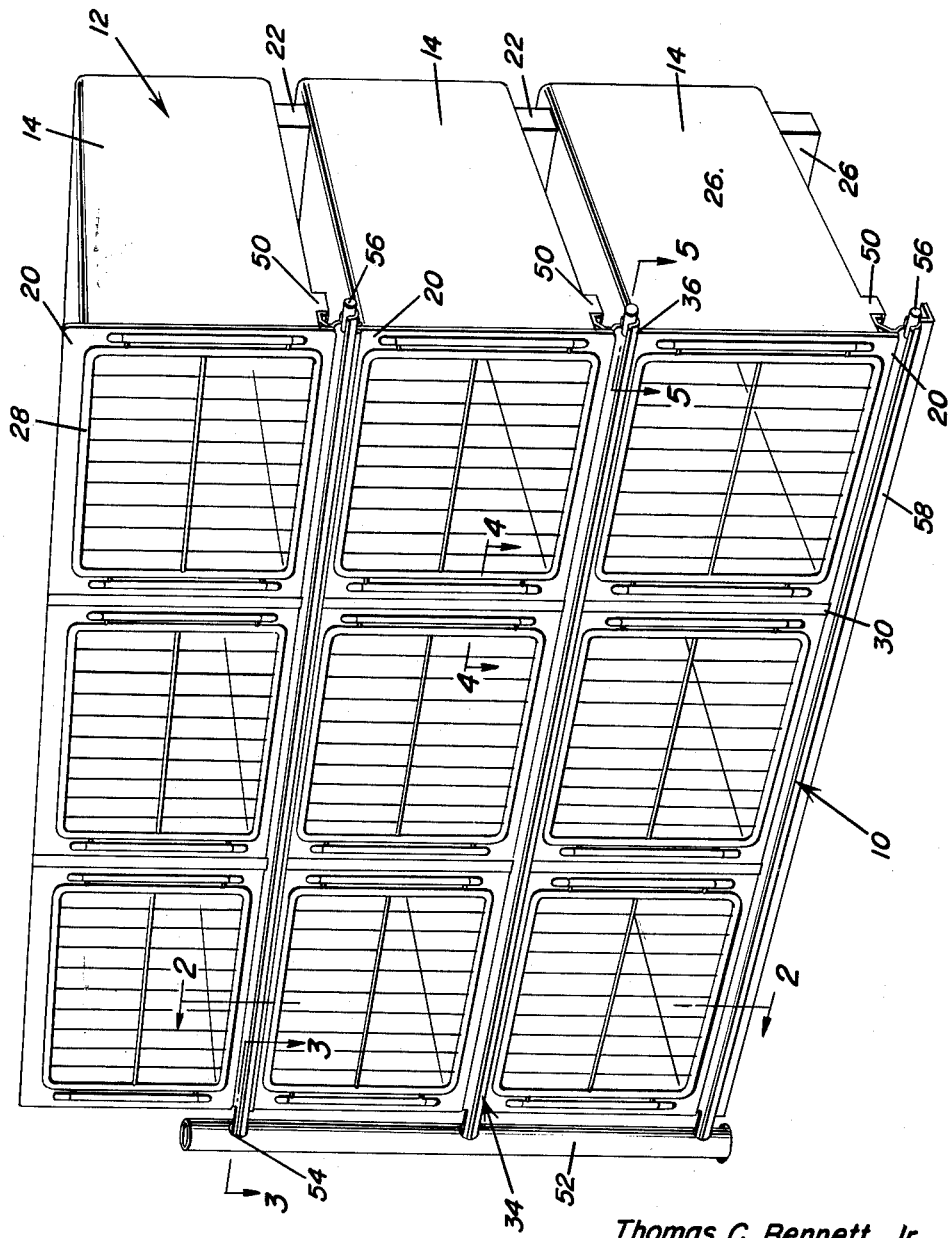
FIGURE 1 is a perspective view of an animal cage assembly incorporating the concepts of the present invention.

Referring now specifically to the drawings, the numeral 10 generally designates the animal cage assembly of the present invention which includes a plurality of container-like cages each being generally designated by the numeral 12 and each including side walls 14, a bottom wall 16, a top wall 18 and a rear wall with the open front end thereof being defined by a laterally outwardly extending peripheral flange 20. The cages 12 are constructed of a fiber impregnated resin plastic such as Fiberglas. When molding the cages 12, sufficient draft may be provided in the mold so that the bottom wall 16 is inclined slightly downwardly when the peripheral flange 20 is disposed vertically thus providing a self-draining feature so that any liquids deposited on the bottom wall 16 will gravitate out of the front end of the cage thereby providing a self-draining cage so that liquid waste materials provided by the animals will be automatically drained from the cage. When assembling a plurality of cages 12, the rear end portions thereof are spaced apart by spacer strips 22.

Each of the cages 12 is provided with a closure door 28 which is hinged about a vertical axis such as any suitable hinge construction with the other vertical edge having a suitable catch for retaining the same in closed position. The door 28 is preferably skeletonized in that it has a peripheral frame and is provided with intersecting rod-like elements forming a closure for the cage and yet permitting ventilation and observation of and for the animals. The doors 28 may be hinged about either vertical edge or may hinge about the lower or top edge depending upon the individual desires and the door may be disposed on the outer face of the flange 20 or may be disposed within the confines of the walls 14, 16 and 18 with it being necessary that the bottom edge of the door be slightly spaced from the bottom wall 16 or the flange 12 for permitting drainage of the cage 12 to facilitate cleaning thereof.

For joining the vertical edges of the flanges 20 together, there is provided a plurality of sections of generally H-shaped framing elements 30 each of which is provided with spaced flanges 32 extending from each side edge thereof which receive and frictionally engage the adjacent vertical flanges 20 thus locking the flanges 20 together and orientating the same in vertical alignment. The vertical framing elements 30 are sectional in that they are broke at the bottom edge of the flanges 20 and do not extend continuously vertically.

For securing the facing and adjacent horizontal portions of the flanges 20 together, there is provided continuous horizontal framing elements each being generally designated by the numeral 34 which extends completely across the cage assembly 10 and, like the framing element 30, is preferably in the form of an extruded aluminum or plastic member which is resistant to corrosion as is the cages. The horizontal framing element 34 is provided with an arcuate trough shaped member 36 which is generally cylindrical in configuration and may extend for more than 180° of a circle with the outer edge of the trough shaped member 36 being free as indicated by the numeral 38 and with the inner edge thereof including a short vertical flange 40 terminating in an inclined flange 42 which extends upwardly and laterally outwardly in relation to the longitudinal axis of the trough-shaped member 36. The inclined flange 42 terminates in a horizontal flange 44 extending in a plane perpendicular to the plane of the vertical flange 40 and the horizontal flange 44 is provided with a depending vertical flange 46 at its inner edge.

Integral with the bottom surface of the trough shaped member 36 is a downwardly opening channel shaped member 48 which telescopes over and frictionally engages the upwardly extending portion of the peripheral flange 20 on an underlying cage 12, thus mounting the framing element 34 onto the flange 20 extending across the top wall 18. As clearly illustrated in FIGURE 2, the flange 40 is substantially in the same plane as the rear flange of the downwardly facing channel shaped member 48 whereby the flange 40 will engage the inner surface of the lower portion of the flange 20 on an overlying cage 12, with the bottom edge of the depending flange 20 on the overlying cage 12 terminating within the trough shaped member 36 thereby assuring deposit of liquid into the trough shaped member 36 when it is drained downwardly from the inclined bottom wall 16 of an overlying cage 12. The horizontal flange 44 engages the undersurface of the bottom wall 16 and the flange 46 abuts against a short transverse member 50 such as a 1″ by 2″ member that is molded to each individual cage to serve as a stop for the flange 46 to but in order to position flange 44 and inclined flange 42 so that the same will be frictionally retained against the inner surface of the depending portion of the flange 20 with flange 44 forming the sole support for the upper cages.

As illustrated in FIGURE 7, the trough shaped element 36 extends beyond one end of the channel shaped member 48, flanges 40, 42, 44 and 46 and extends into a vertical sewer pipe 52 through an opening 54 provided therefor thereby discharging liquids into the sewer pipe 52.

The trough shaped element 36 may be provided with an incline or fall throughout its length in relation to the channel shaped member 48 and the various flanges so that regardless of the length of the framing element that may be provided, sufficient fall will be provided for causing discharge of liquid into the upright sewer pipe or waste pipe 52 which may empty into a suitable sewer connection or into a receptacle or the like. The end of the trough shaped member 36 remote from the pipe 52 may be closed by providing an insertible plug 56 such as a conventional tapered cork plug clearly illustrated in FIGURE 5 which will frictionally retain itself within the open end of the trough shaped member 36 thus closing this end and assuring that liquids will be discharged into the vertical sewer pipe 52.

For supporting the lowermost horizontal framing element 44, there is provided an elongated L-shaped bracket 58 having one flange thereof secured to the floor as by use of fastening screws 60 with the horizontal flange forming a support and the vertical flange being received within the downwardly facing channel 48. The bracket 58 can be fastened directly to casters or wheels for mobility of the assembly.

FIGURES 8 and 9 illustrate a slightly modified form of vertical framing element 30′ in which the inner flange 32′ is provided with an inturned free edge flange 62 for engagement. This construction is quite similar to the vertical framing element 30 illustrated in FIGURE 6 but the flange 62 provides the additional gripping engagement with the flange 20′ and provides a more secure interconnection between the vertical flanges 20′ on adjacent side walls 14′.

FIGURES 10 and 11 illustrate a modified form of horizontal framing element 34′ which illustrates a substantially U-shaped trough member 36′ having a rounded free edge 38′ and a vertically extending flange 40′ of considerable more magnitude than the flange 40 in FIGURE 2. The flange 40′ is disposed against the inner surface of the flange 20′ and is provided with an offset horizontal flange 64 on the rear surface thereof and spaced below the upper edge thereof with the flange 64 having an upturned and upwardly extending flange 66 together with an inclined flange 68 terminating in a horizontal flange 70 which engages the undersurface of the bottom 18′ and the edge of the transverse member 50′ as clearly illustrated in FIGURE 10.

The downwardly spacing channel-shaped member 48′ is provided with an offset angulated element 72 at the lower inner edge thereof for rigidifying this portion of the framing element 34′.

Referring now specifically to FIGURES 12–16 of the drawings, the numeral 80 generally designates another animal cage assembly including enlarged bottom receptacles or cages 82, intermediate side cages 84 stacked thereon and smaller size cages 86 stacked thereon in which all of the cages are interconnected by transverse or horizontal framing elements 88 and sectional vertical framing elements 90. As illustrated in FIGURE 13, the horizontal framing elements 88 are substantially H-shaped and are provided with spaced parallel flanges 92 facing outwardly for receiving the vertical flanges 94 on each cage 82, 84 and 86 with the flanges projecting in the same manner as in the cages described in the preceding figures of the drawings. FIGURE 14 illustrates the vertical framing members 90 each of which are H-shaped and provided with flanges 96 for engaging and receiving the flanges 98 on the vertical side walls of the cages 82, 84 and 86 with the framing elements 88 and 90 acting in substantially the same manner as the vertical framing elements in the construction of the invention illustrated in FIGURES 1–11.

FIGURE 15 illustrates a modified form of framing element with the trough built-in which is equivalent to the framing element 34′ in which the flange 40′ is secured to the flange 20′ by a fastener 100. The trough shaped member 36′ is provided with a depending collar adapter 102 to which is connected a drain pipe 104 extending downwardly and terminating within the next lower trough shaped member 36′ wherein all of the liquid material will gravitate to the lowermost trough at which point it may be conveniently discharged to either a sewer, receptacle or the like.

FIGURE 16 illustrates another modified form of framing element generally designated by the numeral 106 which is generally L-shaped and including flanges 108 and 110 with the flanges 108 being longer than the flanges 110 thus facilitating the insertion of the framing element 106 between the flanges on the cages and thus facilitating the assembly and disassembly of the cages.

It is pointed out that the device may be used with or without the fastening members 100 for securing the flanges 20 to the framing element 40' and the orientation of the cages may vary as desired for different needs. On some installations, such as when used only on one or two cages, both ends of the trough shaped member 36 may be plugged by a cork 56 and the trough shaped member then will be cleaned periodically. Where no pitch or fall is desired toward a single drain, the trough shaped member may be installed substantially level and a vertical drain spout or pipe installed at each end. When using the interlocking feature only, the entire cage assembly may be inclined slightly rearwardly and downwardly so that liquids may accumulate in the rear of each cage for subsequent cleaning.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An animal cage assembly comprising a plurality of horizontally disposed tiers of animal cages with the open front end of each cage having a peripheral flange thereon including vertical side edges and horizontal top and bottom edges, continuous framing elements interconnecting the adjacent horizontal flanges, and sectional vertical framing elements interconnecting the adjacent vertical edges, and means supporting the rear portions of the cages in spaced relation, the bottom wall of each cage being inclined downwardly and forwardly for self-drainage.

2. The structure defined in claim 1 wherein said vertical framing elements are substantially H-shaped in cross-sectional configuration including outwardly opening spaced flanges for receiving the flanges on the cages therebetween, said framing element frictionally engaging the flanges on the cages.

3. The structure as defined in claim 1 wherein said horizontal framing elements are substantially H-shaped in transverse cross-sectional configuration and including upwardly and downwardly facing channels or grooves for frictionally and detachably receiving the horizontal flanges on the cages.

4. The structure as defined in claim 1 wherein said horizontal framing elements are each provided with a longitudinal trough-shaped gutter integral therewith for receiving liquid material from the cages.

5. The structure as defined in claim 4 wherein one end of each gutter is provided with means for plugging and the other end for each gutter is provided with an extension, a vertically disposed sewer pipe alongside of the assembly with the extension on the gutter projecting into the sewer pipe for discharge of liquid waste materials from the cages.

6. The structure as defined in claim 4 wherein said trough shaped gutter is provided with a downwardly opening channel frictionally engaging the upwardly extending flange on an underlying cage, an upwardly extending flange for engagement against the inner surface of a downwardly extending flange on the overlying cage, and a rearwardly extending flange assembly connected to the upwardly extending flange and having a free edge abuttingly engaging a transverse member extending under the cages thus holding the vertical flange against the inner surface of the flange on the overlying cage.

7. The structure as defined in claim 5 wherein said means for plugging the trough shaped gutter includes a tapered cork plug.

8. The structure as defined in claim 1 wherein said continuously horizontally disposed framing element includes a trough shaped gutter, said gutter having a down pipe connected thereto with the down pipe having a free lower end terminating within the gutter of an underlying framing element thereby discharging liquid material into the lowermost gutter.

9. An animal cage assembly comprising a plurality of horizontally disposed tiers of animal cages with the open front end of each cage having a peripheral flange thereon including vertical side edges and horizontal top and bottom edges, continuous framing elements interconnecting the adjacent horizontal flanges, and sectional vertical framing elements interconnecting the adjacent vertical edges, and means supporting the rear portions of the cages in spaced relation with the bottom wall of the cage being inclined downwardly for self-drainage, all of said cages being provided with a bottom wall sloping forwardly for self-drainage of liquid materials.

10. The combination of claim 9 wherein each of said cages is constructed from a fiber impregnated plastic resin.

11. An animal cage comprising a generally rectangular hollow container of fiber impregnated plastic resin having rounded corners and a smooth surface to facilitate the cleaning thereof, said container having being of one-piece construction and an open front and provided with a pivotal closure therefor with the walls of the container diverging toward the open front to provide an inclined bottom for self-drainage of the cage.

12. An animal cage comprising a generally rectangular hollow container of fiber impregnated plastic resin having rounded corners and a smooth surface, said container having an open front and provided with a closure therefor with the walls of the container diverging toward the open front to provide an inclined bottom for self-drainage of the cage, said open front of the container extending completely to the front edge of the inclined bottom for discharge of flowable material from the cage.

13. An animal cage assembly comprising a plurality of horizontally disposed tiers of animal cages, each cage having an open front end, a peripheral flange extending outwardly from the open front end and including vertical side edges and horizontal top and bottom edges, continuous framing elements interconnecting the adjacent horizontal flanges, and sectional vertical framing elements interconnecting the adjacent vertical flanges, and means supporting the rear portions of the cages in spaced relation, each of the cages having the wall thereof diverging from the rear to the open front whereby the bottom is inclined downwardly and forwardly for discharge of liquid material from the open front of the cage.

References Cited in the file of this patent

UNITED STATES PATENTS

| 1,347,397 | Newman | July 20, 1920 |
| 1,870,957 | Meriaux | Aug. 9, 1932 |
| 2,524,229 | Krueger | Oct. 3, 1950 |
| 2,611,338 | Yellin | Sept. 23, 1952 |
| 2,667,143 | Havens | Jan. 26, 1954 |

FOREIGN PATENTS

| 545,539 | France | July 25, 1922 |